(12) United States Patent
Detela

(10) Patent No.: US 7,034,425 B2
(45) Date of Patent: Apr. 25, 2006

(54) HYBRID SYNCHRONOUS ELECTRIC MACHINE

(75) Inventor: Andrej Detela, Ljubljana (SI)

(73) Assignee: Harmonic Drive Systems Inc., Tokyo (JP)

( * ) Notice: Subject to any disclaimer, the term of this patent is extended or adjusted under 35 U.S.C. 154(b) by 0 days.

(21) Appl. No.: 10/482,308

(22) PCT Filed: Jul. 9, 2001

(86) PCT No.: PCT/JP01/05980

§ 371 (c)(1),
(2), (4) Date: Jun. 1, 2004

(87) PCT Pub. No.: WO03/007459

PCT Pub. Date: Jan. 23, 2003

(65) Prior Publication Data

US 2004/0207281 A1    Oct. 21, 2004

(51) Int. Cl.
*H02K 19/00* (2006.01)

(52) U.S. Cl. .................................... 310/162
(58) Field of Classification Search ............ 310/162, 310/164, 256, 49 R
See application file for complete search history.

(56) References Cited

U.S. PATENT DOCUMENTS

| | | | | |
|---|---|---|---|---|
| 3,710,158 A | * | 1/1973 | Bachle et al. | 310/156.02 |
| 4,288,709 A | * | 9/1981 | Matthias et al. | 310/49 R |
| 4,672,247 A | * | 6/1987 | Madsen et al. | 310/49 R |
| 5,130,593 A | * | 7/1992 | Connell | 310/256 |
| 5,712,521 A | * | 1/1998 | Detela | 310/162 |
| 6,091,168 A | * | 7/2000 | Halsey et al. | 310/61 |
| 6,483,212 B1 | * | 11/2002 | Mimura et al. | 310/68 R |
| 6,492,758 B1 | * | 12/2002 | Gianni et al. | 310/257 |
| 6,700,271 B1 | * | 3/2004 | Detela | 310/164 |
| 6,849,982 B1 | * | 2/2005 | Haydock et al. | 310/164 |

FOREIGN PATENT DOCUMENTS

| | | | |
|---|---|---|---|
| DE | 19800667 A1 | * | 8/1999 |
| EP | 0 544 200 A1 | | 6/1993 |
| EP | 0 544 200 B1 | | 6/1993 |
| EP | 0 762 618 A1 | | 3/1997 |
| JP | 50-143008 | | 11/1975 |
| JP | 02-228241 | | 9/1990 |
| JP | 05-276696 | | 10/1993 |
| JP | 09-117117 | | 5/1997 |
| JP | 2000-197301 | | 7/2000 |
| WO | WO 9619861 A1 | * | 6/1996 |

* cited by examiner

*Primary Examiner*—Joseph Waks
(74) *Attorney, Agent, or Firm*—Buchanan Ingersoll PC

(57) ABSTRACT

A hybrid synchronous electric machine driven by the transverse magnetic flux has a rotor and a stator, the rotor armature has a massive cogged iron rings (12) in close vicinity of active parts of the motor, and cogged iron rings (14, 15) as component parts of the rotor are provided with cross-cut insulating gaps. Eddy current losses are low because eddy currents in cogged iron rings are impeded by cross-cut insulating gaps therein. Eddy currents in all passive parts of the motor (rotor armature (11), stator armature (1), ball bearing (9) and the like) are negligible since the current induced in the copper ring (12) neutralizes all the dissipated magnetic flux outside the active area of the motor. A hybrid synchronous electric machine which has low eddy current losses and high energy efficiency can be realized.

9 Claims, 5 Drawing Sheets

(B)

(A)

HYBRID SYNCHRONOUS ELECTRIC MACHINE

TECHNICAL FIELD

The present invention pertains to a synchronous hybrid electric machine with transverse magnetic flux. In particular, the present relates to a synchronous hybrid electric machine whose structure is such that it minimizes eddy current losses in the motor and thus, it provides improved energy efficiency as compared to conventional motors with similar construction.

PRIOR ART

Hybrid electric machines are a subclass of synchronous electric machines. In construction they are similar to stepper motors with in-built permanent magnets that increase magnetic filed density in the air gap, but unlikely the stepper motors, the hybrid electric machines are usually fed by sinusoidal electric currents.

Special constructions of such motors are already known. Namely, hybrid electric machines with transverse magnetic flux have coils, which are coaxial with the motor axis; their advantage is good energy efficiency due to small ohmic losses in the coaxial coils.

A motor of this construction is described in the European patent 0544200, wherein it has in each phase of the stator only one coil which is coaxial with the motor axis and magnetises simultaneously a circular array of stator yokes which encircle the stator coil. Similarly, in each phase of the rotor this motor also has only one permanent magnet, which is also coaxial with the motor axis and is placed between two iron rings with salient poles on inner and outer circumference. The number of salient poles on each circumference equals the number of stator yokes.

The machine according to the above-described constructional solution has high torque per weight and good energy efficiency. This is advantageous especially at low motor speed when efficiency of other electric motors is usually low.

However, at high speed when magnetic fluxes in the motor alternate with considerably high frequency, we meet the problem of induced electric currents. The coin in each phase is coaxial with motor axis; therefore dissipated magnetic flux induces electric current in every such part of the motor which is also coaxial and electrically conducting. Such parts are especially the stator armature and the rotor armature (passive motor parts), and then also iron rings in the rotor.

Detailed analysis shows that in motors with transverse magnetic flux (that is, with coaxial coils) the currents induced in the above-mentioned coaxial parts may be considerably great. They may consume much more energy than in corresponding parts of conventional motors with longitudinal magnetic flux. Energy losses of the described type are great especially when motor runs at high speed and torque (therefore, at high power); in this case they may be much greater than all other losses taken together. Energy efficiency at high values of mechanical power is then seriously spoiled and the motor may overhear.

One partial solution could be replacement of metal as the building material in passive parts (especially in rotor and stator armature) with electrically insulating materials (like ceramics or plastic materials), but usually such solutions are either too expensive (for ceramics) or mechanically inadequate (for plastics).

Consequently, there is a need in the art for additional high-power hybrid electric machines, which have coaxial coils and transverse magnetic flux, yet their construction does not permit flow of induced electric currents in coaxial parts of the motor.

DISCLOSURE OF THE INVENTION

An object of the present invention is therefore to find such a constructional solution of stator armature, rotor armature, and iron rings of the rotor, that induction of undesirable eddy currents within these parts is strongly damped or impeded.

The above object has been successfully achieved by a hybrid synchronous machine with transverse magnetic flux comprising a rotor and a stator, the rotor armature comprising a rotor assembly having cogged iron rings, and the rotor assembly having cross-cut insulating gaps. The hybrid synchronous machine also has at least one massive copper ring in close vicinity of the active motor parts.

Namely, a hybrid synchronous electric machine with transverse magnetic flux of the present invention is characterized in that it comprises: a rotor and a stator; the rotor comprises at least one rotor assembly (13) of cogged iron rings (14, 15); and each assembly has at least one cross-cut insulating gap (22).

Further, the hybrid synchronous electric machine with transverse magnetic flux of the present invention is characterized in that it comprises: a rotor, a stator, and a massive conducting ring (12); and the conducting ring (12) is coaxial with the motor axis (5) and in close vicinity of the active area of the motor.

Here, the conducting ring (12) may be made of copper. The conducting ring (12) may be part of the rotor armature (11).

It is desired that the cogged iron rings (14, 15) of the assembly (13) are electrically insulated from the supporting conducting ring (12).

The stator may be assembled by at least one circular array (2) constituted by U-shaped stator yokes (3*b* or 3*c*) spaced closely together, each yoke (3*b* or 3*c*) asymmetrically consisting of two identical, but mutually overturned iron parts (23*b*, 24*b* or 23*c*, 24*c*).

The hybrid synchronous motor according the present invention has low eddy current losses because eddy currents in cogged iron rings are impeded by cross-cut insulating gaps in these same iron rings, while eddy currents in all passive parts of the motor (like rotor armature, stator armature, and ball bearings) are negligible since the current induced in the copper ring neutralizes all the dissipated magnetic flux outside the active area of the motor. Further, this motor is very compact, strong and mechanically stable, despite low eddy current losses.

SYMBOLS

Figure 1:
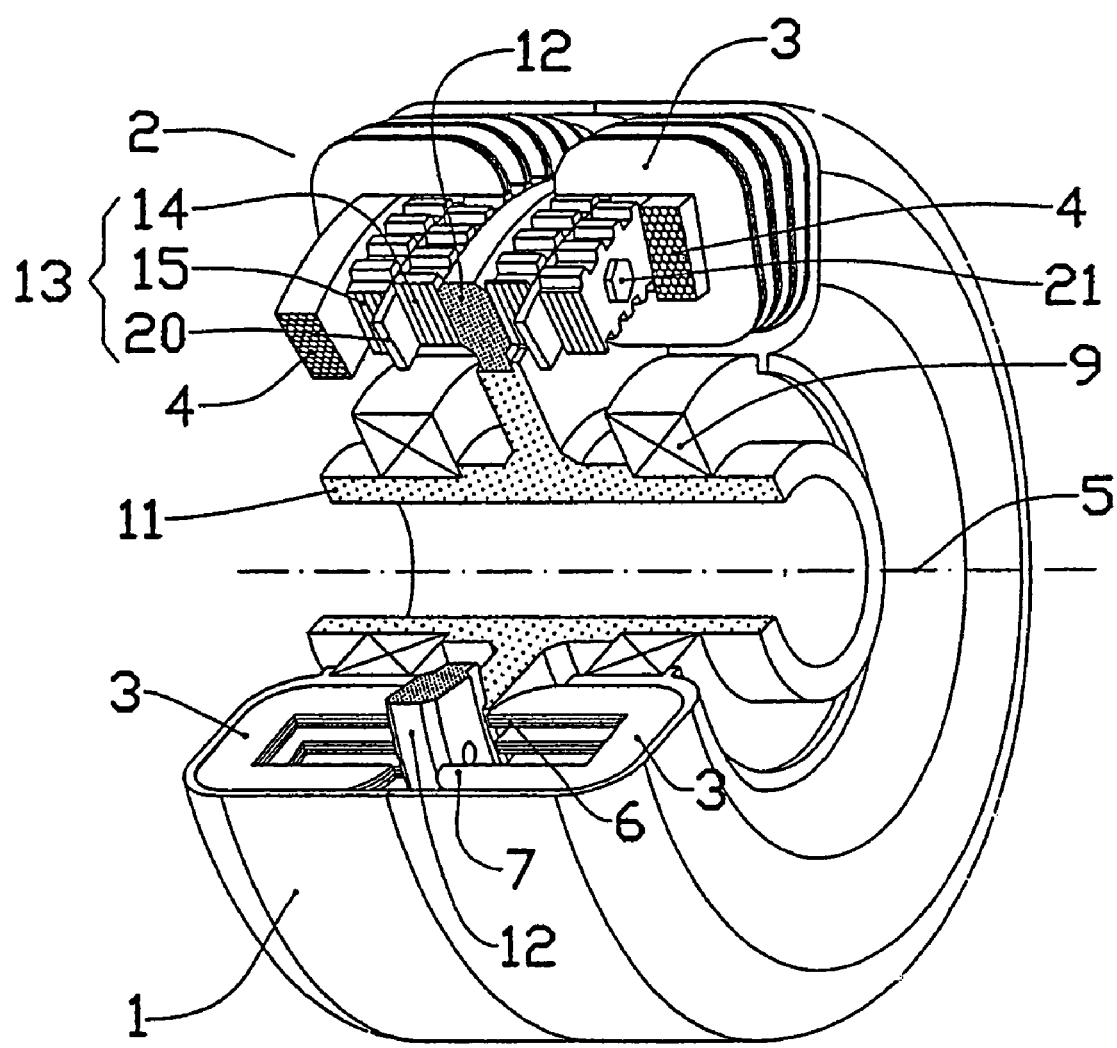
FIG. 1 is an axonometric view of a two-phase synchronous hybrid electric machine with transverse magnetic flux according to the invention, in partial cross-section.

1 Stator armature
2 Circular array
3, 3b, 3c Stator yokes
4 Winding
5 Motor axis
6 Stator pole
7 Stator pole
9 Ball bearing
11 Rotor armature
12 Copper ring (conducting ring)
13 Rotor assembly
14, 15, 14b, 15b 14c, 15c Cogged rings
16 to 19, 16b to 19b, 16c to 19c Rotor poles
21 Screw
22 Insulating gap
23b, 24b, 23c, 24c Component parts of the stator yoke

BEST MODE FOR CARRYING OUT THE INVENTION

With respect to the drawings, examples of the present invention will now be explained.

In FIG. 1, a first embodiment (example A) of a two-phase synchronous hybrid electric machine with transverse magnetic flux according to the invention is shown. To each side of the stator armature (1) is fixed a circular array (2) of U-shaped stator yokes (3) which encircle the stator winding (4) of the corresponding phase. The windings (4) are coaxial with the motor axis (5).

Figure 3:
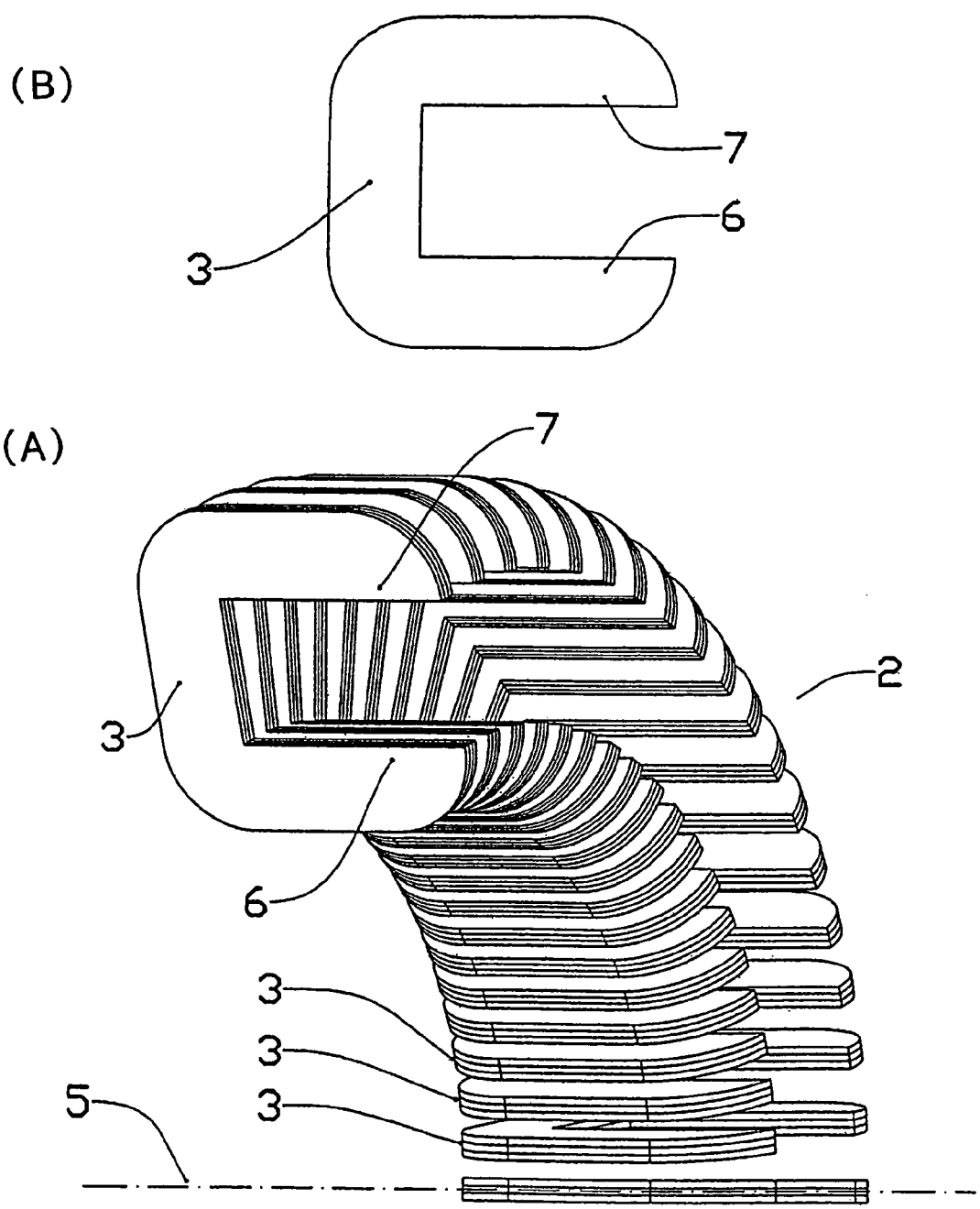
FIGS. 3(A) and 3(B) are an axonometric view of a circular array of stator yokes (one phase, example A) of the motor according to the invention, in partial cross-section, and a side view of the stator yokes, respectively.

Stator yokes (3) with salient poles (6, 7) are more precisely shown in FIG. 3. The yokes may be of bulk iron but it is better that the yokes (3) are lamination packages, as it is shown in FIGS. 1 and 3.

The rotor armature (11) connected to the stator armature (1) via ball bearings (9), is fitted with a massive copper ring (12) to which on each side an assembly (13) of rotor rings is fixed. This assembly (13), which is more precisely shown in FIG. 2(A) (example A), consists of two cogged rings (14, 15) of ferromagnetic material fitted with equally spaced rotor poles (16, 17, 18, 19) and a magnetized disk (20).

The ferromagnetic cogged rings (14, 15) can be lamination packages, just like the stator yokes (3). (For the sake of clarity, these lamellae are not shown in FIG. 2). The magnetized disk (20) is magnetized in the axial direction so as to produce a magnetic flux that can be directed either from the cogged ring (14) to the cogged ring (15) or in the opposite direction. The cogged rings (14, 15) and the magnetized disk (20) can be held together by means of screws (21), as shown more precisely in FIG. 2(A). The same screws (21) can be used to fasten the rotor assembly (13) to the copper ring (12).

The cogged rings (14, 15) are electrically insulated from the supporting copper ring (12), this can be achieved for instance by applying a thin ceramic layer onto the stems of the screws (21) and onto the surface of the copper ring (12). The cogged rings (14, 15) have in at least one place a narrow insulating gap (22) to prevent free circulation of circular eddy currents, as is shown in FIG. 2(A). The same holds for the magnetized disk (20).

The cogged rotor rings (14, 15) and the stator yokes (3) are in the magnetic juncture; in each phase the number of stator yokes (3) is equal to the number of rotor poles (16, 17, 18, 19). The cogged rings (14, 15) in the assembly (13) of variant A are placed such that their outer poles (18, 19) are mutually shifted for one half of pole division, as shown in FIG. 2(A) (example A). The same holds for the inner poles (16, 17).

In example A there is also mutual shift for one half of pole division between the poles (16, 18) of the first cogged ring (14), and similarly, there is also mutual shift between the poles (17, 19) of the second cogged ring (15). In FIG. 2(A) this relative position of opposing poles on inner and outer rotor circumference is more precisely shown by the dotted line S.

At a chose moment of observation, when the stator pole (6) covers the rotor pole (17) and, due to the shift of the cogged ring (14) against the cogged ring (15), the stator pole (7) covers the rotor pole (18), a current starts running in the winding (4) in such a direction that the density of magnetic field in the air gap between the stator pole (6) and the rotor pole (17) of the cogged ring (15), and between the stator pole (7) and the rotor pole (18) of the cogged ring (14) decreases, while the density of magnetic field in the air gaps between the stator pole (6) and the rotor pole (16) of the cogged ring (14) and between the stator pole (7) and the rotor pole (19) of the cogged ring (15) increases.

Because of such momentous magnetic state the stator poles attract the rotor poles towards a position which is shifted by ½ of the pole's division with regard to the position at the chosen moment, so that in the end position of observation the stator pole (6) coincides with the rotor pole (16) of the cogged ring (14), and the stator pole (7) coincides with the rotor pole (19) of the cogged ring (15). At this moment the direction of current in the winding (4) inverts. This causes the rotor to move forwards, so that it reassumes the initially observed position of mutual covering of the rotor and stator poles. Through the change of current direction in the stator winding (4) the rotation of rotor is enabled, while the change itself can be achieved by electronic commutation.

In motors with transverse magnetic flux considerable voltages are induced in all active parts which are coaxial with the motor axis (5). In the motor according to the invention, such parts are the cogged rings (14, 15) and the magnetized disk (20). These ring-like parts (14, 15, 20) are cut by insulating gap (22) in at least one place so that the induced voltage cannot drive circular currents around these rings (14, 15, 20). This is shown in FIG. 2(A) (example A). The gap (22) can be filled with some electrically insulating adhesive material. The induced currents also cannot bypass the insulating gap via the copper ring (12) since the rings (14, 15, 20) are electrically insulated from the supporting copper ring (12).

In this way eddy current losses in the active parts of the motor are considerably reduced, which is significant especially at high motor speed and at high torque when the magnetic flux changes are great. It can be shown that the insulating gap (22) in each rotor assembly (13) can reduce eddy current losses in the cogged iron rings by a factor of approximately 10.

There are also eddy current losses in the passive parts of the motor, namely in the rotor armature (11), stator armature (1), and ball bearings (9). Unluckily, they cannot be reduced in the same way since these parts are the supporting parts of the motor. Namely, insulating gaps in the supporting parts would reduce the mechanical precision and would spoil compactness of the motor. According to the invention, this problem is solved by a massive copper ring (12) which is placed outside the active area with a strong magnetic field, but still is in close vicinity of this active area. So this ring (12) does not affect the magnetic field in the active parts, yet it considerably affects the dissipated magnetic fields outside of the active area.

This dissipated magnetic flux of the machine with transverse magnetic flux induces circular AC electric current around the copper ring (12). This induced AC current produces its own magnetic flux, which is coupled to the original dissipated magnetic flux. A detailed analysis (according to conventional methods in theory and practice of electric machines) shows that the original dissipated AC magnetic flux and the induced AC magnetic flux approximately cancel each other if the quantity Q defined by relation:

$$Q = \xi/(\mu_o \cdot \zeta \cdot \omega) \qquad (1)$$

is much less than 1.

In the above formula the following notations are used:

$\xi$ is the specific electric resistance of the material used in the ring (12). For copper at working temperature of the motor, $\xi$ is approximately $2 \cdot 10^{-8} \Omega m$.

$\mu_o$ is the induction constant ($4\pi \cdot 10^{-7}$ Vs/Am)

S is the cross-section area of the ring (12) in units of $m^2$. In FIG. 1 this is marked by the shaded cross-section of the ring (12).

$\omega$ is the circular frequency of the electric current in the motor coils (in units of $s^{-1}$) Usually we take $\omega$ at nominal speed of the motor.

$\zeta$ is a dimensionless parameter depending on the geometry and precise proportions of the motor. The parameter $\zeta$ is usually between 0.5 and 0.7 for constructional designs where the conducting ring (12) is exactly between the active areas of the two phases of the motor with transverse magnetic flux. This is the case shown in FIG. 1 where we see the conducting ring (12) between two cogged rings (14) of the two phases of the motor according to the invention. If the conducting ring (12) is not in this central position, then the parameter $\zeta$ is smaller. The construction with greater $\zeta$ is advantageous (see the text below).

The solution according to the present invention applies inmost of the cases, except in such cases when the nominal motor speed is so low that we cannot get Q smaller than unity. In these exceptional cases the copper ring (12) is not used, and the rotor armature (11) can extend into the area near the active parts of the motor. Then it is good that the armatures (11) and (1) are then made of materials with much higher electric resistance $\xi$, since in such cases we have no other means to reduce eddy currents in the passive parts of the motor.

Luckily, it turns out that for most practical application, the quantity Q is indeed quite smaller than 1. In every such case the dissipated magnetic flux is nearly completely cancelled out. Then the eddy current losses in the motor housing (stator armature) and in the rotor armature are very small. What remains are practically only the losses in the copper ring (12), but also these losses are much smaller than ohmic losses in the motor coils (the ratio between these two types of losses is just of the order of Q). Hence, if Q is much smaller than 1, then losses in the copper ring are negligible if compared to the ohmic losses in the coils (4). Further, eddy current losses in rotor and stator armature (11, 1) are in the case of small Q even much smaller than losses in the copper ring (12). Hence, overall eddy current losses are much smaller than eddy current losses in motors without the conducting ring (12) where losses in the armature would be quite large.

It is evident that one should look for such a constructional solution of the machine with transverse magnetic flux that the parameter Q is much smaller than 1. This can be achieved by a conducting ring (12) with great cross-section S and small specific electric resistance $\xi$. Therefore the proposed choice is use of a massive copper ring (12). The holes for screws (21) should not be too wide so that the passage of electric current along the conducting ring (12) is not considerably impeded by them.

The ring (12) forms an attached part of the rotor armature (11), so instead of pure copper (oxygen free & high conductivity copper) which is too soft for mechanical applications, one can make a compromise by use of copper with small addition of alloying metals. In this way one can quite easily and sufficiently increase the mechanical stiffness without excessively increasing the specific resistance $\xi$.

Therefore, the problem of eddy current losses has been successfully solved by a hybrid synchronous machine with transverse magnetic flux, the rotor armature (11) comprising of at least one massive copper ring (12) in close vicinity of the active motor parts, and the rotor rings (14, 15, 20) having at least one cross-cut insulating gap (22).

The described solution also improves the compactness of motor. Namely, the cogged iron rings (14, 15) with cross-cut insulating gaps (22) are more flexible than rings without these gaps (22), especially in the case they are lamination packages. Hence, the rotor rings (14, 15, 20) need a firm support, which can be easily provided by the massive copper ring (12).

Figure 4:
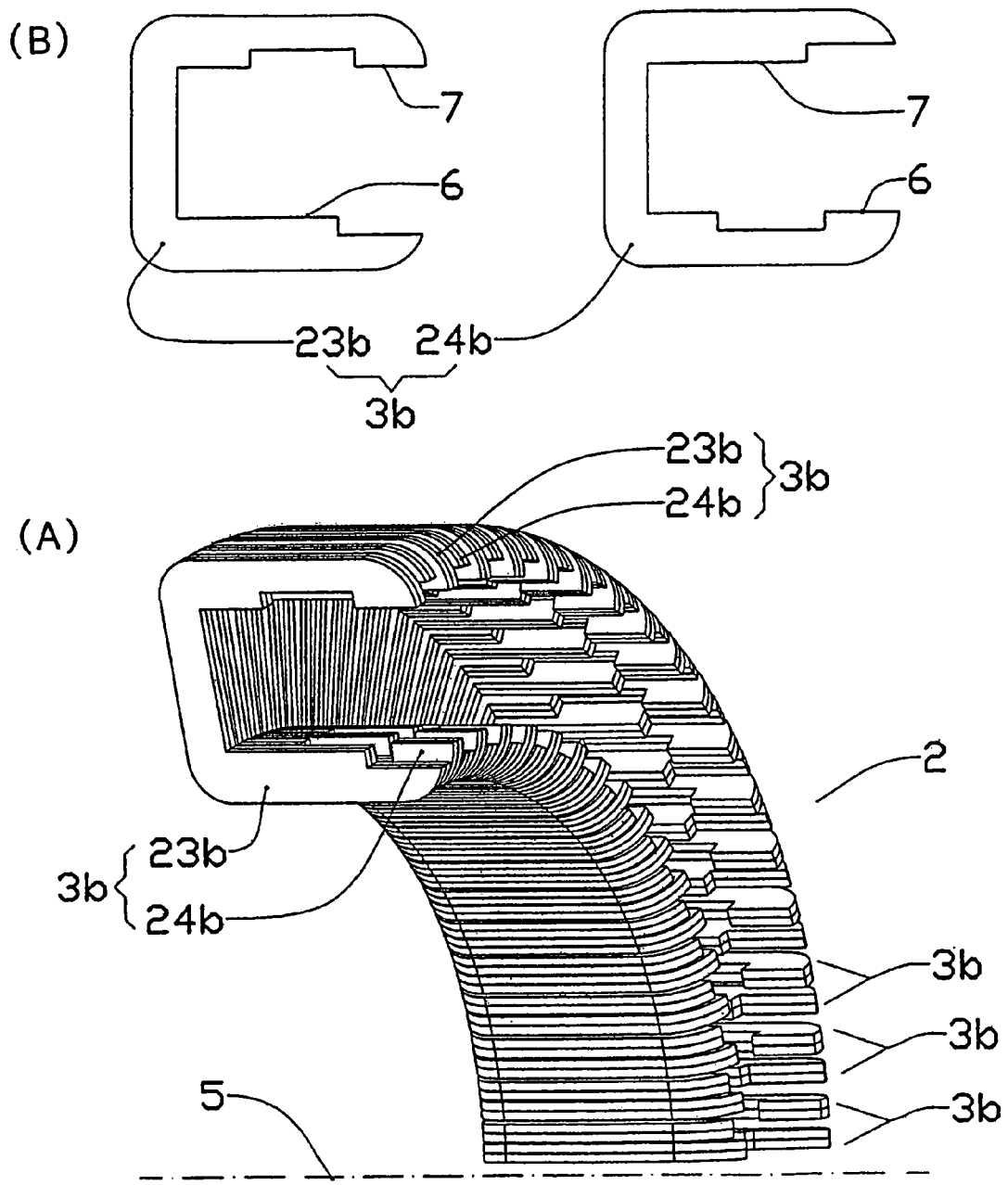
FIGS. 4(A) and 4(B) are an axonometric view of a circular array of stator yokes (one phase, example B) of the motor according to the invention, in partial cross-section, and a side view of the stator yoke, respectively; and, FIGS. 5(A) and 5(B) are an axonometric view of a circular array of stator yokes (one phase, example C) of the motor according to the invention, in partial cross-section, and a side view of the stator yoke, respectively.
Figure 5:
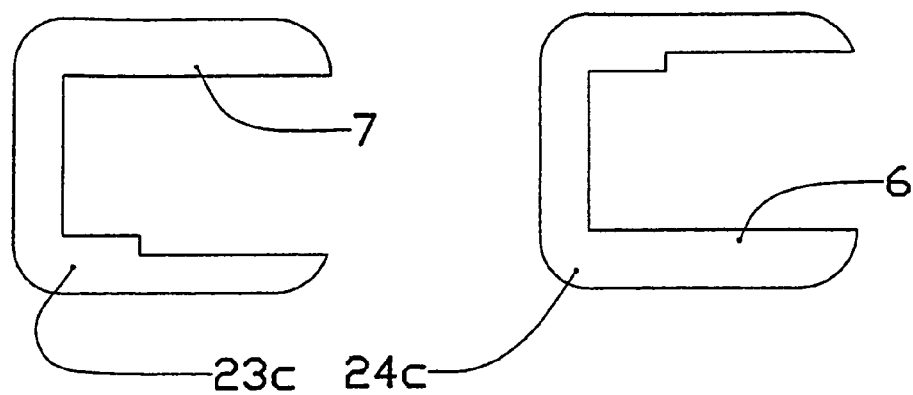
Figure 5:
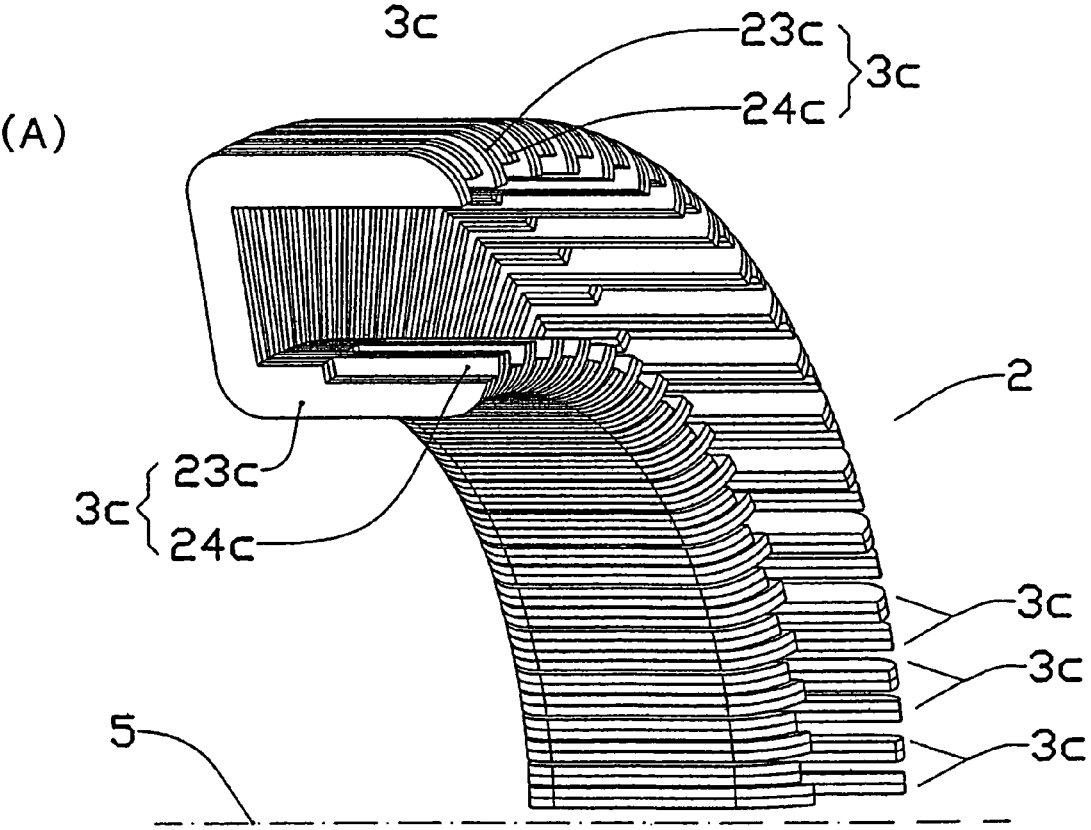

Another improvement in motor compactness, which is also a matter of the present invention, is shown in FIGS. 4 and 5. Constructions with these improvements are described as examples B and C, which introduce some modifications to the original example A shown in FIG. 3. As we see in FIG. 1 and in FIG. 3, in example A the U-shaped stator yokes (3) in the circular array (2) are separated from each other. Some additional part (e.g., made from plastic material) must provide for the desired separation between the yokes (3) in example A.

As we see in FIG. 4, in example B this plastic part is no more necessary, since the stator yokes (3b) are not separated among themselves. Instead of one simple and symmetrical yoke (3) in variant A, in variant B we have a yoke (3b) of more complicated shape. In fact, this yoke (3b) is a pair of two parts (23b, 24b). These two parts (23b, 24b) are equal, but the first part (23b) is turned upside down, while the second part (24b) is turned downside up, as is seen in FIG. 4.

In example B one yoke (3b) is carrying the same magnetic flux as one yoke (3) in the example A. But since there is no distance between the yokes (3b), each yoke (3b) is twice wider than the yoke (3) of variant A, and consequently the radial thickness of the yoke (3b) can be only one half of the corresponding thickness in variant A. This can be seen if we compare FIGS. 3 and 4. So also the housing of the motor can be smaller, which, together with dense packing of the stator yokes (3b), contributes to motor compactness. Another advantage is easier assembling of the motor, since in variant B there is no need to provide for separation between the stator yokes (3b).

Very similar argumentation holds also for example C (shown in FIGS. 2(C) and 5), wherein stator yokes (3c) are also assembled closely together into a circular array (2). Each yoke (3c) is in fact a pair of two parts (23c, 24c) which are again equal, with provision that the first part (23c) is turned upside down and the second part (24c) is turned downside up. Also the yokes (3c) make motor similarly compact and easy to assemble.

Due to different angular poison of stator poles (6, 7) in examples B and C, in examples B and C the relative poison of rotor poles slightly differs from the one described for example A. Corresponding rotor parts are shown in FIGS. 2(B) and 2(C).

Figure 2:
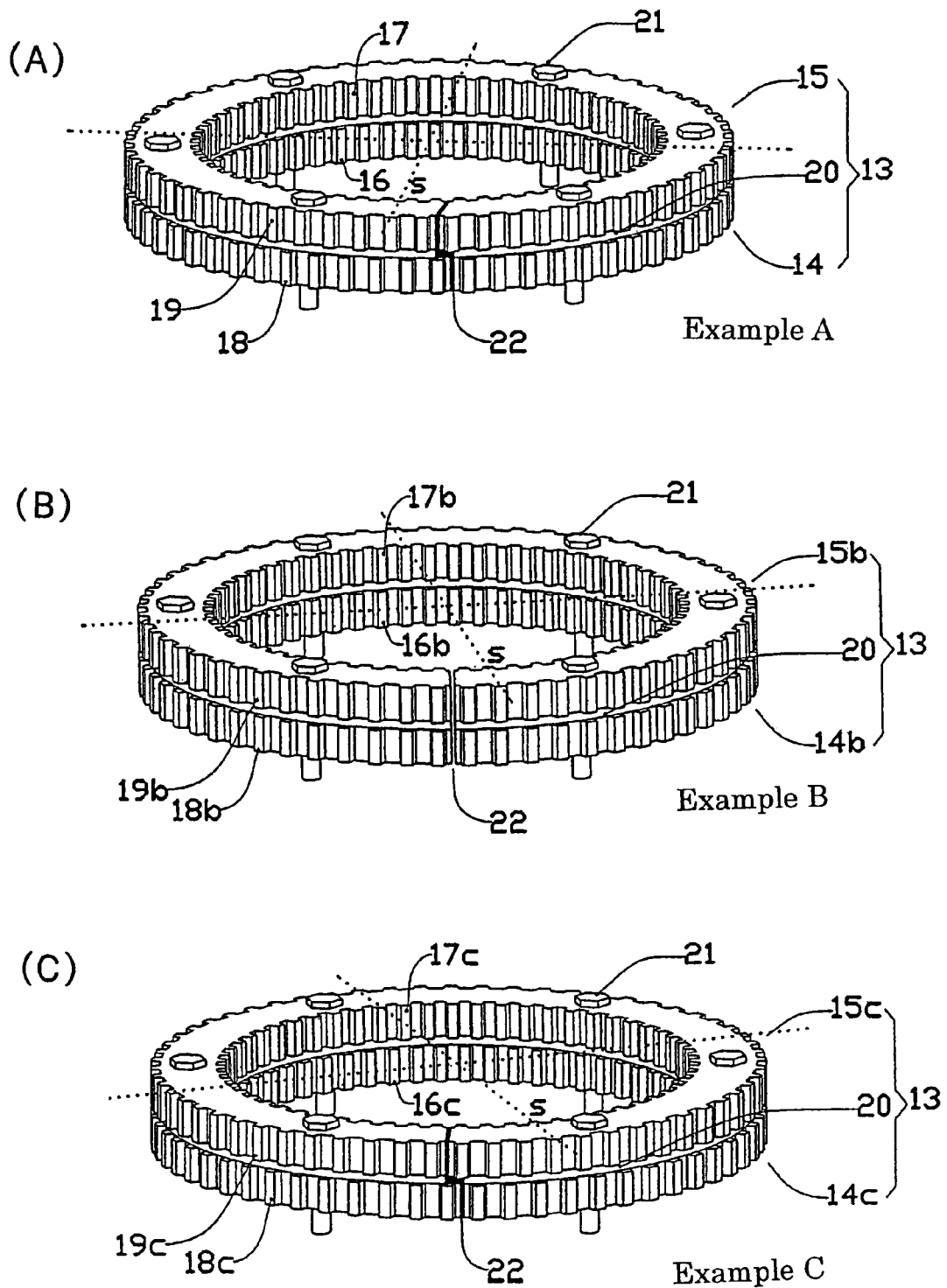
FIGS. 2(A) to 2(C) are axonometric views of an assemble of rotor rings in one motor phase (examples A, B, C), showing a narrow insulating gap and insulating screws.

In example B of FIG. 2(B), the cogged rings (14b, 15b) in the assembly (13) are placed such that their outer poles (18b, 19b) are not mutually shifted. The same holds for mutual shift of the inner poles (16b, 17b). There is also no mutual shift between the poles (16b, 18b) of the first cogged ring (14b), and similarly, there is also no mutual shift between the poles (17b, 19b) of the second cogged ring (15b). In FIG. 2 (variant B) this relative position of opposing poles on inner and outer rotor circumference is more precisely shown by the dotted line s.

In example C, the cogged rings (14c, 15c) in the assembly (13) are placed such that their outer poles (18c, 19c) are mutually shifted for one half of pole division (like in example A), and the same holds for mutual shift of the inner poles (16c, 17c). But there is no mutual shift between the poles (16c, 18c) of the first cogged ring (14c), and similarly, there is also no mutual shift between the poles (17c, 19c) of the second cogged ring (15c). Again, in FIG. 2(C) (example C) this relative poison of opposing poles on inner and outer rotor circumference is more precisely shown by the dotted line s.

In this way the same magnetic juncture of rotor and stator poles can be achieved in all three examples (A, B and C), which leads also to equivalent functioning in all three cases.

INDUSTRIAL APPLICABILITY

As explained above, the hybrid synchronous electric machine driven by the transverse magnetic flux of the present invention is constituted to have the rotor and the stator, and the rotor armature has the cogged iron rings provided with at least one cross-cut insulating gap. Further, according to the present invention, the machine has the rotor, the stator and the conducting ring; the conducting ring is arranged coaxial with the motor axis and is in the close vicinity of the active area of the motor.

According to the present invention, the hybrid synchronous motor having low eddy current losses can be obtained, because eddy currents in cogged iron rings are impeded by cross-cut insulating gaps in these same iron rings. In addition, eddy currents in all passive parts of the motor (like rotor armature, stator armature, and ball bearings) are negligible since the current induced in the copper ring neutralizes all the dissipated magnetic flux outside the active area of the motor.

Further, according to the present invention, the hybrid synchronous motor can be realized which is very compact, strong and mechanically stable, despite low eddy current losses.

The invention claimed is:

1. A hybrid synchronous electric machine comprising:
a rotor and a stator;
the rotor comprising at least one assembly of cogged iron rings, and each assembly having at least one cross-cut insulating gap;
the conducting ring being coaxial with a motor axis and in close vicinity of an active area of the motor;
wherein the conducting ring is formed as part of a rotor armature.

2. The hybrid synchronous electric machine according to claim 1, wherein the conducting ring is made of copper.

3. A hybrid synchronous electric machine comprising:
a rotor and a stator;
the rotor comprising at least one assembly of cogged iron rings, and each assembly having at least one cross-cut insulating gap;
the conducting ring being coaxial with a motor axis and in close vicinity of an active area of the motor;
wherein the cogged iron rings of the rotor assembly are supported by the conducting ring and are electrically insulated from the conducting ring.

4. A hybrid synchronous electric machine comprising:
a rotor and a stator;
the rotor comprising at least one assembly of cogged iron rings, and each assembly having at least one cross-cut insulating gap;
wherein the stator comprises at least one circular array, and the circular array is constituted by U-shaped stator yokes spaced with one another.

5. A hybrid synchronous electric machine comprising:
a rotor and a stator;
the rotor comprising at least one assembly of cogged iron rings, and each assembly having at least one cross-cut insulating gap;
wherein the stator comprises at least one circular array, the circular array comprises stator yokes closely arranged with each other, and each stator yoke asymmetrically consists of two identical, but mutually overturned iron parts.

6. A hybrid synchronous electric motor comprising:
a rotor, a stator and a conducting ring;
the conducting ring being coaxial with a motor axis and in close vicinity of an active area of the motor;
wherein the conducting ring is formed as part of a rotor armature.

7. The hybrid synchronous electric motor according to claim 6, wherein the conducting ring is made of copper.

8. A hybrid synchronous electric motor comprising:
a rotor, a stator and a conducting ring;
the conducting ring being coaxial with a motor axis and in close vicinity of an active area of the motor;
wherein the stator comprises at least one circular array, and the circular array is constituted by U-shaped stator yokes spaced with one another.

9. A hybrid synchronous electric motor comprising:
a rotor, a stator and a conducting ring;
the conducting ring being coaxial with a motor axis and in close vicinity of an active area of the motor;
wherein the stator comprises at least one circular array, the circular array comprises stator yokes closely arranged with each other, and each stator yoke asymmetrically consists of two identical, but mutually overturned iron parts.

* * * * *